United States Patent
Suzuki et al.

(10) Patent No.: US 7,674,024 B2
(45) Date of Patent: *Mar. 9, 2010

(54) INTERIOR ILLUMINATION LAMP

(75) Inventors: Hiroyuki Suzuki, Haibara-gun (JP); Kimihiro Ishii, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/968,924

(22) Filed: Oct. 21, 2004

(65) Prior Publication Data

US 2005/0105297 A1    May 19, 2005

(30) Foreign Application Priority Data

Oct. 22, 2003   (JP) ............................ P2003-361791

(51) Int. Cl.
*B60Q 1/00* (2006.01)
*B60Q 1/26* (2006.01)

(52) U.S. Cl. .................... 362/488; 362/490; 362/471; 362/479

(58) Field of Classification Search ................. 362/488, 362/490

See application file for complete search history.

(56) References Cited

U.S. PATENT DOCUMENTS

| | | | | |
|---|---|---|---|---|
| 5,070,434 | A * | 12/1991 | Suman et al. | 362/490 |
| 5,526,241 | A * | 6/1996 | Ferrell | 362/490 |
| 6,283,621 | B1 * | 9/2001 | Macri | 362/490 |
| 6,350,048 | B1 * | 2/2002 | Stanton et al. | 362/478 |
| 6,595,656 | B2 * | 7/2003 | Yoda | 362/488 |
| 6,851,841 | B2 * | 2/2005 | Sugihara et al. | 362/490 |
| 2004/0120160 | A1 * | 6/2004 | Natsume | 362/544 |

FOREIGN PATENT DOCUMENTS

| | | | |
|---|---|---|---|
| JP | 63-121149 U | | 8/1988 |
| JP | 02011431 A | * | 1/1990 |
| JP | 6-63436 U | | 9/1994 |
| JP | 2000-1141 A | | 1/2000 |

OTHER PUBLICATIONS

Japanese Office Action dated Apr. 23, 2008.

* cited by examiner

*Primary Examiner*—Sandra L O'Shea
*Assistant Examiner*—William J Carter
(74) *Attorney, Agent, or Firm*—Sughrue Mion, PLLC

(57) ABSTRACT

A bulb 37 and a reflecting plate 40 are disposed in offset relation to a lens 54 so that an optical axis LB1 of a beam, emitted from the bulb 37, and an optical axis LB2 of reflection light, reflected by the reflecting plate 40, can intersect an axis CL of the lens 54 in a forward-rearward direction of a vehicle. Therefore, the beam can be radiated forwardly without directing the lens 54 forwardly. In the case where two reflecting surfaces 41a and 41b of an identical shape are provided symmetrically on the reflecting plate 40, and are arranged in the forward-rearward direction of the vehicle, and there are provided a pair of bulbs 37, a pair of reflecting plates 40 and a pair of lens 54 each pair of which are provided respectively for left and right (two) directions, the pair of reflecting plates, having an identical construction, are used. Therefore, the cost can be reduced, and this also prevents an erroneous operation in which the two reflecting plates are mounted in a reversed manner.

10 Claims, 8 Drawing Sheets

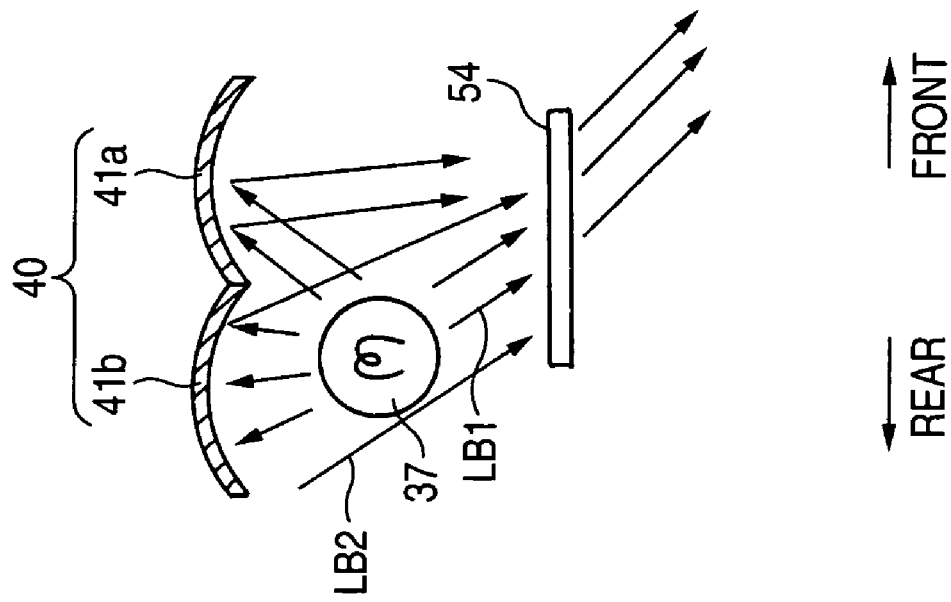
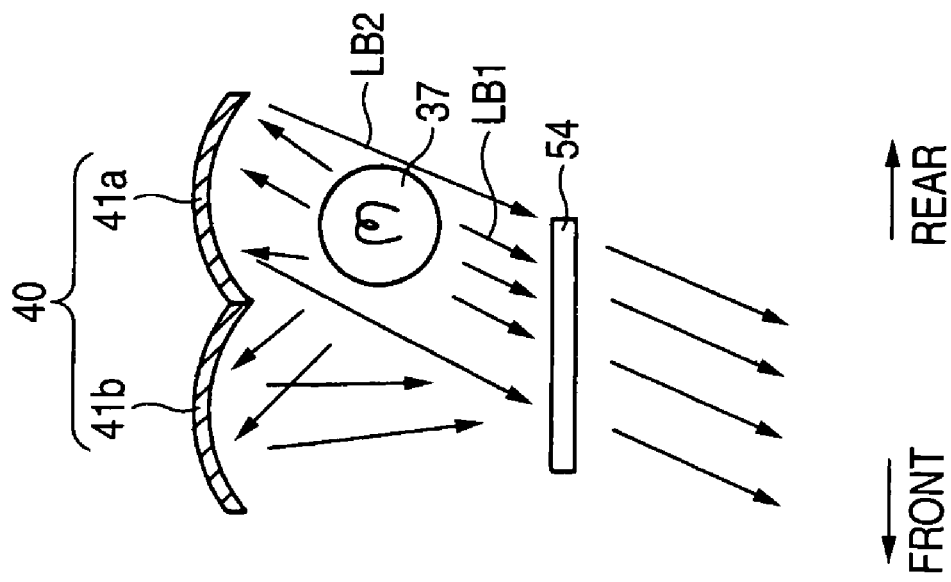

INTERIOR ILLUMINATION LAMP

BACKGROUND OF THE INVENTION

1. Field of the Invention

This invention relates to an interior illumination lamp mounted, for example, on a door, a ceiling or others of an automobile.

2. Related Art

There has been disclosed one example of conventional interior illumination lamps as shown in FIG. 7 as Unexamined Japanese Patent Publication 2000-1141.

This interior illumination lamp is mounted, for example, on a back door of a station wagon, and is used in this condition, and by changing a direction of illumination, the lamp can illuminate a luggage room (provided at a rear portion of the station wagon) and a zone beneath the opened back door.

As shown in FIG. 7, this interior illumination lamp 100 includes a lamp housing 102 mounted on a trim 101 forming a wall surface of the back door, and a round opening 103 is formed in a front side of this lamp housing 102. A lamp support portion 104, having a generally-spherical inner surface, is provided rearwardly of (at the right side in FIG. 7) the opening 103, and a lamp body 105 of a partially spherical shape is provided inside the lamp support portion 104 so as to rotate through an angle of 360 degrees in a predetermined range. A bulb 106 is mounted within the lamp body 105, and a reflecting plate 108 for reflecting light (emitted rearwardly from the bulb 106) forwardly is provided at the rear side (the right side in FIG. 7) of the bulb 106. A lens portion 107 is provided at a front side (the left side in FIG. 7) of the lamp body, and projects from the opening 103 in the lamp housing 102. A space S is formed between the lens portion 107 and an edge of the opening 103, and the amount of rotation of the lamp body 105 is limited.

In the above interior illumination lamp 100, the bulb 106 and the reflecting plate 108 are disposed straight on an axis CL of the lens portion 107 as shown in FIG. 8, and therefore rays of light are radiated in the direction of the axis CL. And besides, generally, the interior illumination lamp 100 for a rear seat is mostly mounted just above the rear seat. Therefore, when the passenger, sitting on the rear seat, rotates or turns the lamp body 105 forwardly in order to use it, the bulb 106, the reflecting plate 108, the lens portion 107, etc., are directed forwardly as shown in FIG. 8, and therefore in some cases, part of the lens portion 7 or the vicinity of the lens portion 107 shines. There is encountered a problem that this light comes into the driver's sight via a room mirror 109, and affects the driving operation.

SUMMARY OF THE INVENTION

This invention has been made in view of the above problems, and an object of the invention is to provide an interior illumination lamp in which when this lamp is used at a rear seat, light is prevented from coming into the driver's sight via a room mirror so that the driving operation will not be affected.

The above object has been achieved by an interior illumination lamp of the invention comprising a light source for emitting a beam, a reflecting plate for reflecting the beam from the light source in a predetermined direction, and a lens capable of transmitting the beam from the light source and the beam from the reflecting plate therethrough; characterized in that the light source and the reflecting plate are disposed in offset relation to the lens so that an optical axis of the beam from the light source and an optical axis of the reflected light from the reflecting plate can intersect an axis of the lens in a forward-rearward direction of a vehicle; and in the case where two reflecting surfaces of an identical shape are provided symmetrically on the reflecting plate, and are arranged in the forward-rearward direction of the vehicle, and there are provided a pair of the light sources, a pair of the reflecting plates and a pair of the lens each pair of which are provided respectively for left and right (two) directions, the pair of reflecting plates, having an identical construction, are used.

In the interior illumination lamp of this construction, the light source and the reflecting plate are disposed in offset relation to the lens so that the optical axis of the beam, emitted from the light source, and the optical axis of the reflection light, reflected by the reflecting plate, can intersect the axis of the lens in the forward-rearward direction of the vehicle. Therefore, the beam can be radiated forwardly without directing the lens forwardly. Therefore, there will not be encountered a situation in which part of the lens shines as when the lens is directed forwardly, and such light is prevented from coming into the driver's sight via a room mirror, and therefore even when the interior illumination lamp is used during the travel of the car, the driving operation will not be affected.

In the interior illumination lamp of this construction, in the case where a pair of light sources, as well as a pair of lens, are provided respectively for left and right seats, the reflecting plates of the same construction can be used in common for the left and right seats, in which case those reflecting surfaces of the two reflecting plates, disposed respectively in opposite directions, are used. Therefore, the cost can be reduced. And besides, this prevents an erroneous operation in which the left and right reflecting plates are mounted in a reversed manner. Here, the term "symmetrical" generally means "symmetrical with respect to a plane" and "symmetrical with respect to a point".

In the present invention, there is solved the problem that light from the interior illumination lamp for the rear seat comes into the driver's sight via a room mirror, and therefore there is achieved an advantage that the driving operation will not be affected.

And besides, in the invention, in the case where the pair of light sources, as well as the pair of lens, are provided respectively for the left and right seats, the reflecting plates of the same construction can be used in common for the left and right seats, in which case those reflecting surfaces of the two reflecting plates, disposed respectively in opposite directions, are used. Therefore, the cost can be reduced, and besides this prevents an erroneous operation in which the left and right reflecting plates are mounted in a reversed manner.

BRIEF DESCRIPTION OF THE DRAWINGS

FIGS. 6A and 6B are cross-sectional views showing a condition in which the interior illumination lamp of the invention is mounted on the vehicle body.

DETAILED DESCRIPTION OF THE PREFERRED EMBODIMENTS

Figure 1:
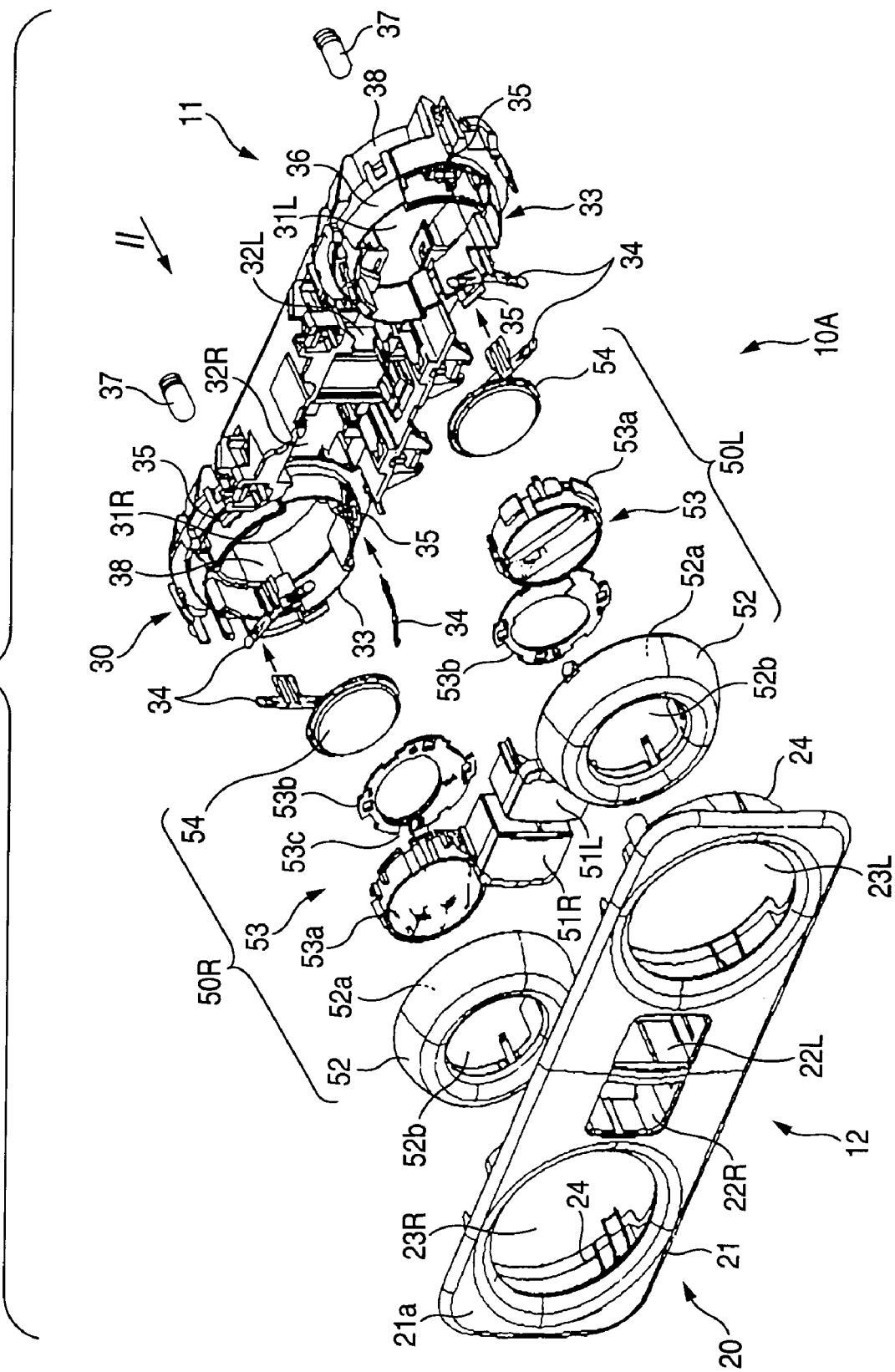
FIG. 1 is an exploded, perspective view showing a preferred embodiment of an interior illumination lamp of the present invention.

A preferred embodiment of the present invention will now be described in detail with reference to the drawings As shown in FIG. 1, the interior illumination lamp 10 of this embodiment includes a design portion 20 for exposure to a car room (passenger compartment) 12 (see FIG. 4), and a function portion body 30 (serving as a body) which is provided on an inner side of the design portion 20, and has various electrical parts mounted thereon.

Figure 4:
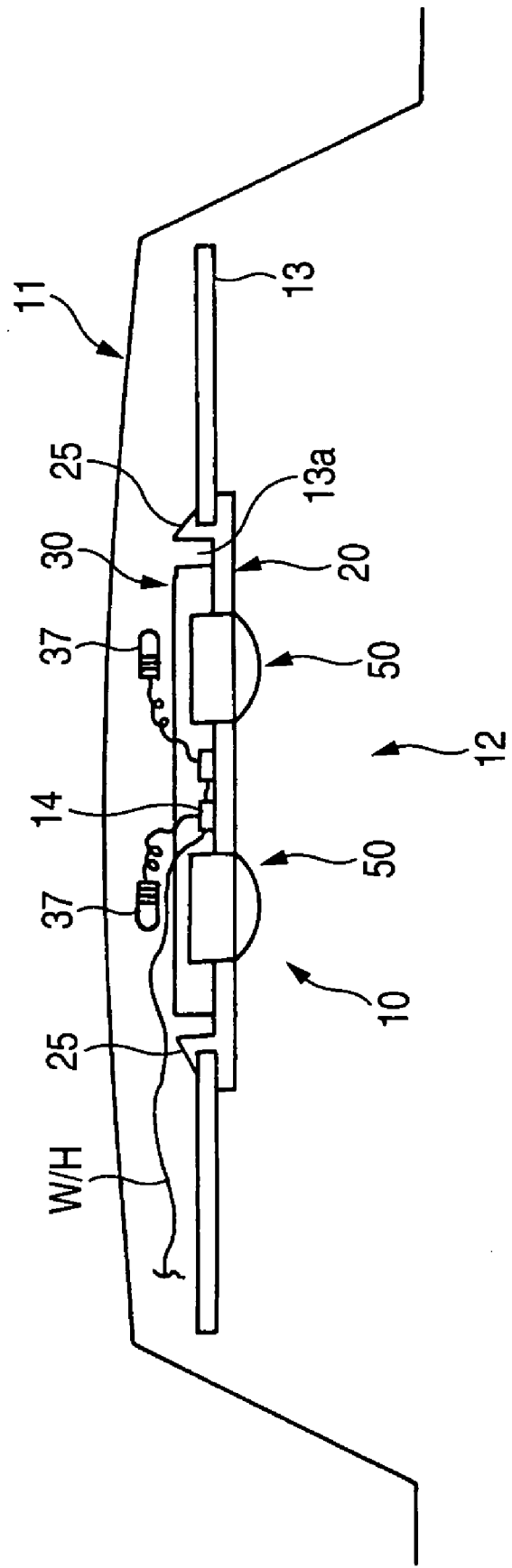
FIG. 4 is a cross-sectional view showing a condition in which the interior illumination lamp of the invention is mounted on a vehicle body.

As shown in FIG. 4, this interior illumination lamp 10 is mounted on a vehicle body 11 by mounting the design portion 20 on an interior member (trim) 13 beforehand mounted on the inside of the vehicle body 11. The interior illumination lamp 10 can be easily connected to a wire harness W/H beforehand installed on a reverse side of the interior member 13.

Figure 2:
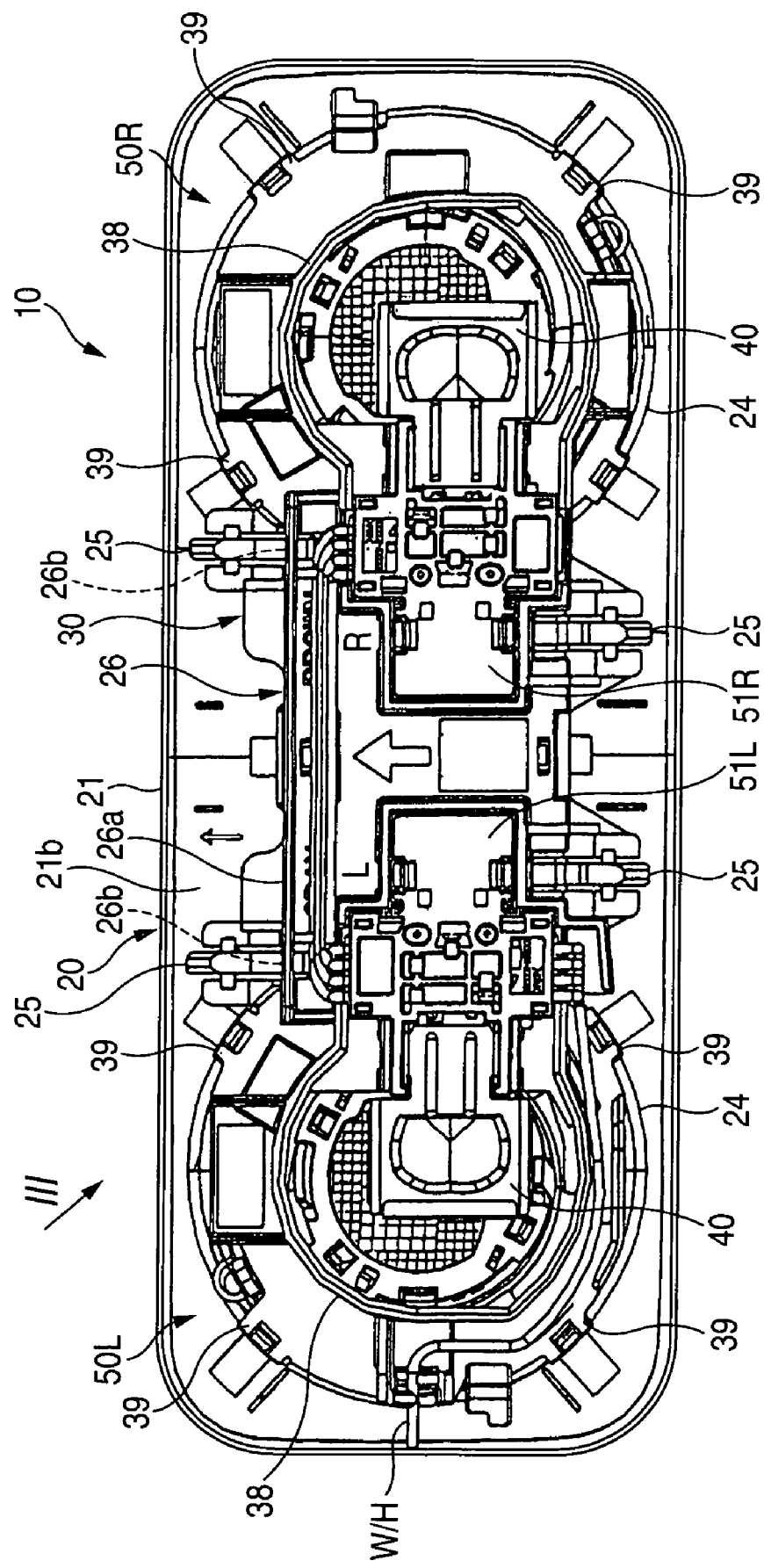
FIG. 2 is a rear view of the interior illumination lamp as seen in a direction II of FIG. 1.
Figure 3:
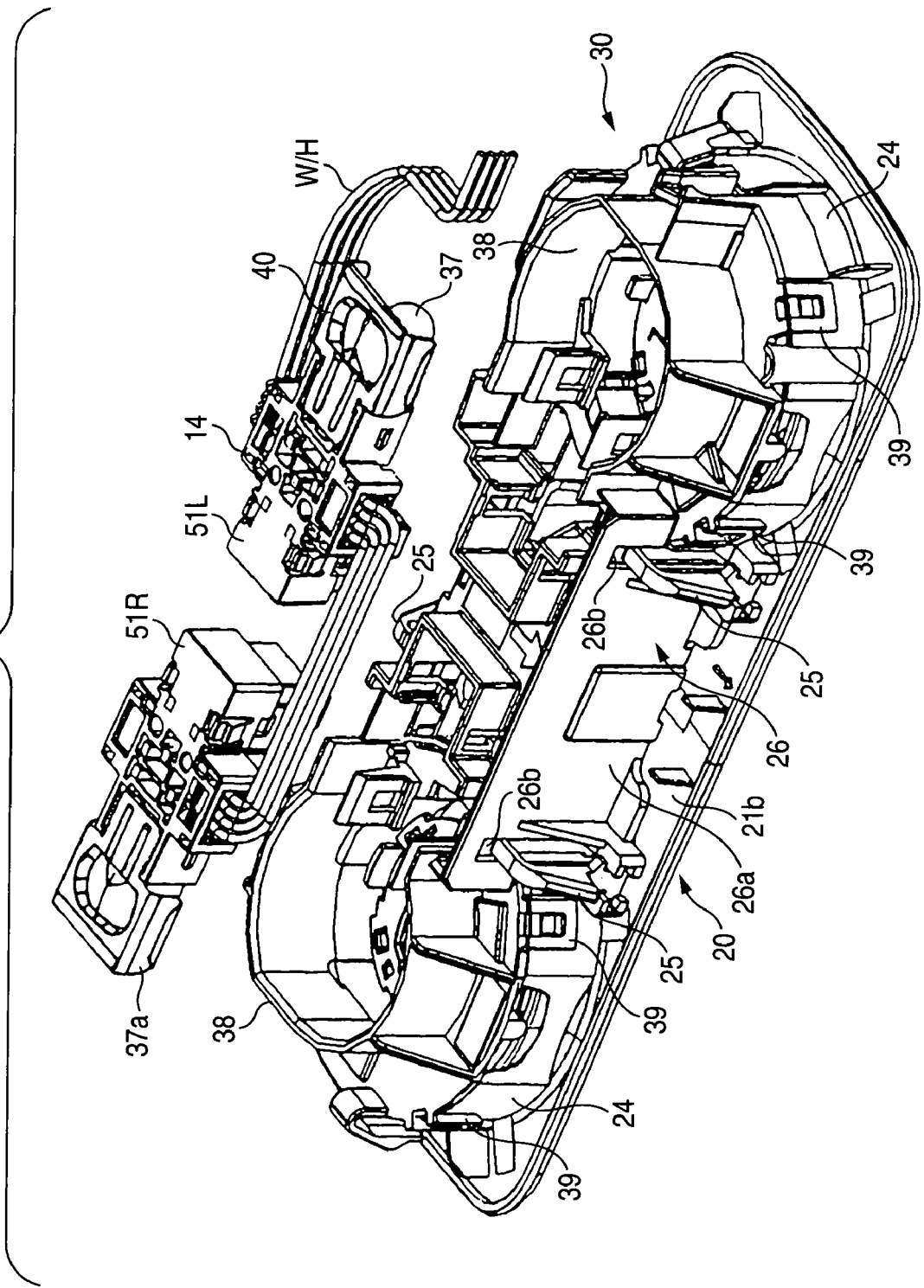
FIG. 3 is a perspective view as seen in a direction III of FIG. 2.

As shown in FIGS. 1 to 3, the design portion 20 includes a housing 21, for example, of a rectangular shape exposed at its surface 21a to the car room 12. Switch holes 22L and 22R are formed through a central portion of the housing 21, and left and right switches 51L and 51R are exposed to the car room 12 respectively through these switch holes 22L and 22R. Also, lamp holes 23L and 23R are formed respectively through left and right portions of the housing 21, and left and right lamps 50L and 50R are exposed to the car room 12 respectively through these lamp holes 23L and 23R. A mounting portion 24 of a generally cylindrical shape is provided at each of the lamp hole portions 23L and 23R, and extends inwardly from a reverse surface 21b of the housing 21, and the function portion body 30 is mounted on the housing 21 through these mounting portions 24. Clips 25 (see FIG. 4) for mounting the housing 21 on the interior member 13 at a ceiling portion of the car room 12 are provided on the reverse surface 21b of the housing 21.

As shown in FIGS. 1 to 3, the function portion body 30 is a housing-like member having an elongated ellipse-shape as a whole, and lamp receiving holes 31L and 31R for respectively receiving the lamps 50L and 50R are formed through left and right end portions thereof, respectively. Switch receiving portions 32L and 32R, in which the switches 51L and 51R are mounted, respectively, are provided at a central portion of the function portion body 30 disposed between the two lamp receiving holes 31L and 31R. Connectors 14, mounted at a distal end portion of the wire harness W/H, are connected to connection terminals of the switches 51L and 51R, and with this construction the switches 51L and 51R can be easily mounted and removed.

Ring members 33 of a circular shape, serving as support portions for respectively supporting the lamps 50L ad 50R, are mounted on edges of the two lamp receiving holes 31L and 31R, respectively. A guide member 38 of a generally cylindrical shape is provided at each of the ring members 33, and projects from the reverse side (the right side in FIG. 1) of the function portion body 30. Those portions of the left and right guide members 38, opposed to each other, are notched so that the various electrical parts, including the switches 51L and 51R and bulbs 37 (serving as light sources), can be mounted on the function portion body 30. The guide members 38 are large in height than all of the electrical parts and others mounted on the function portion body, and function to prevent the electrical parts and others from striking against the vehicle body 11. The bulbs 37 are mounted within the left and right guide members 38, respectively. A reflecting plate 40 is provided at the rear side (the upper side in FIG. 3) of each of the bulbs 37, and can efficiently radiate light, emitted from the bulb 37, in a desired direction.

As shown in FIG. 1, sliding contact member-mounting recesses 35 are formed respectively in three portions of an inner peripheral surface of each ring member 33 equally spaced circumferentially from one another. Sliding contact members 34 are inserted respectively into the sliding contact member-mounting recesses 35 to be mounted therein.

The sliding contact member 34 is a metallic member of a generally T-shape having resiliency, and is normally pressed against a spherical surface 52a by its own resilient force. The resilient member 34 may be made of a resin, and also may have other shape than the generally T-shape.

As shown in FIGS. 1 and 3, guide portions 36 are formed on the outer surface of each of the ring members 33 (provided respectively at the lamp receiving holes 31L and 31R), and project a step therefrom. When the sliding contact members 34 are fittingly mounted respectively in the sliding contact member-mounting recesses 35, an outer surface of each of the guide portions 36 lies between the corresponding adjacent siding contact members 34 in concentric relation thereto, and these guide portions 36 are disposed inwardly of a concentric circle (the spherical surface 52a) on which a sliding contact surface for the sliding contact members 34 are disposed.

A plurality of retaining claws 39 for mounting the function portion body 30 are formed on the outer surface of each ring member 33 at suitable intervals. Therefore, each mounting portion 24 of the design portion 20 is held between the retaining claws 39 and the ring member 33, thereby connecting the function portion body 30 and the housing 21 of the design portion 20 together.

As shown in FIG. 1, the left and right lamps 50L and 50R are mounted between the design portion 20 and the function portion body 30. The left and right lamps 50L and 50R have the same construction, and therefore in the following description, these will be referred to merely as the lamp 50 unless otherwise specified.

The lamp 50 includes an outer bezel 52, an inner bezel 53, and a lens 54, and this lamp 50 radiates rays of light, emitted from the bulb 37, in a predetermined direction.

The outer bezel 52 has such a size that its distal end portion projects into the car room 12 through the lamp hole 23L, 23R in the design portion 20. The outer bezel 52 has a partially spherical shape as a whole, and the concave spherical surface 52a is formed on an inner surface thereof. A window 52b in which the lens 54 fits is formed through a central portion of the outer bezel. The lens 54 is so cut as to radiate a beam in a predetermined range.

The inner bezel 53 includes a bezel body 53a of a generally cylindrical shape, and a lens holder 53b mounted on the bezel body 53a through a hinge 53c so as to be opened and closed. Therefore, a convex surface of the lens 54 is fitted in a rear end portion of the bezel body 53a, and the lens holder 53b is closed, thereby holding the lens 54.

The inner bezel 53 is engaged in the inside of the outer bezel 52, so that the lens 54 is retained in a double manner.

The left and right lamps 50L and 50R are mounted respectively in the lamp receiving holes 31L and 31R in the function portion body 30 in such a manner that each lamp 50L, 50R can be angularly moved (turned), and can also be fixed in a predetermined position. Namely, the three sliding contact members 34, mounted on the function portion body 30, are disposed inside the outer bezel 52, and are resiliently pressed against the spherical surface 52a, so that the outer bezel 52 can be angularly moved relative to the function portion body 30, and can also be fixed in a desired position.

Figure 5:
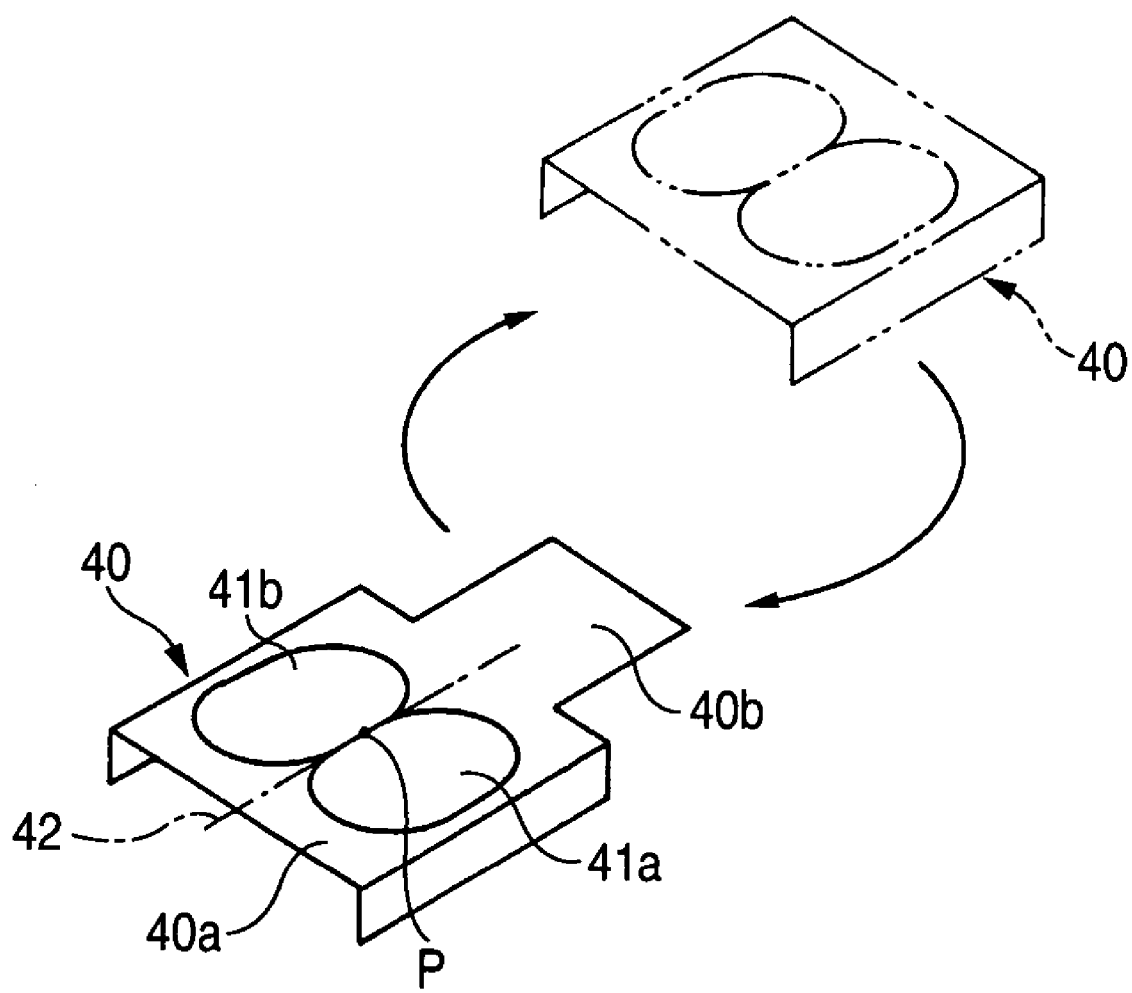
FIG. 5 is a perspective view of a reflecting plate.
Figure 7:
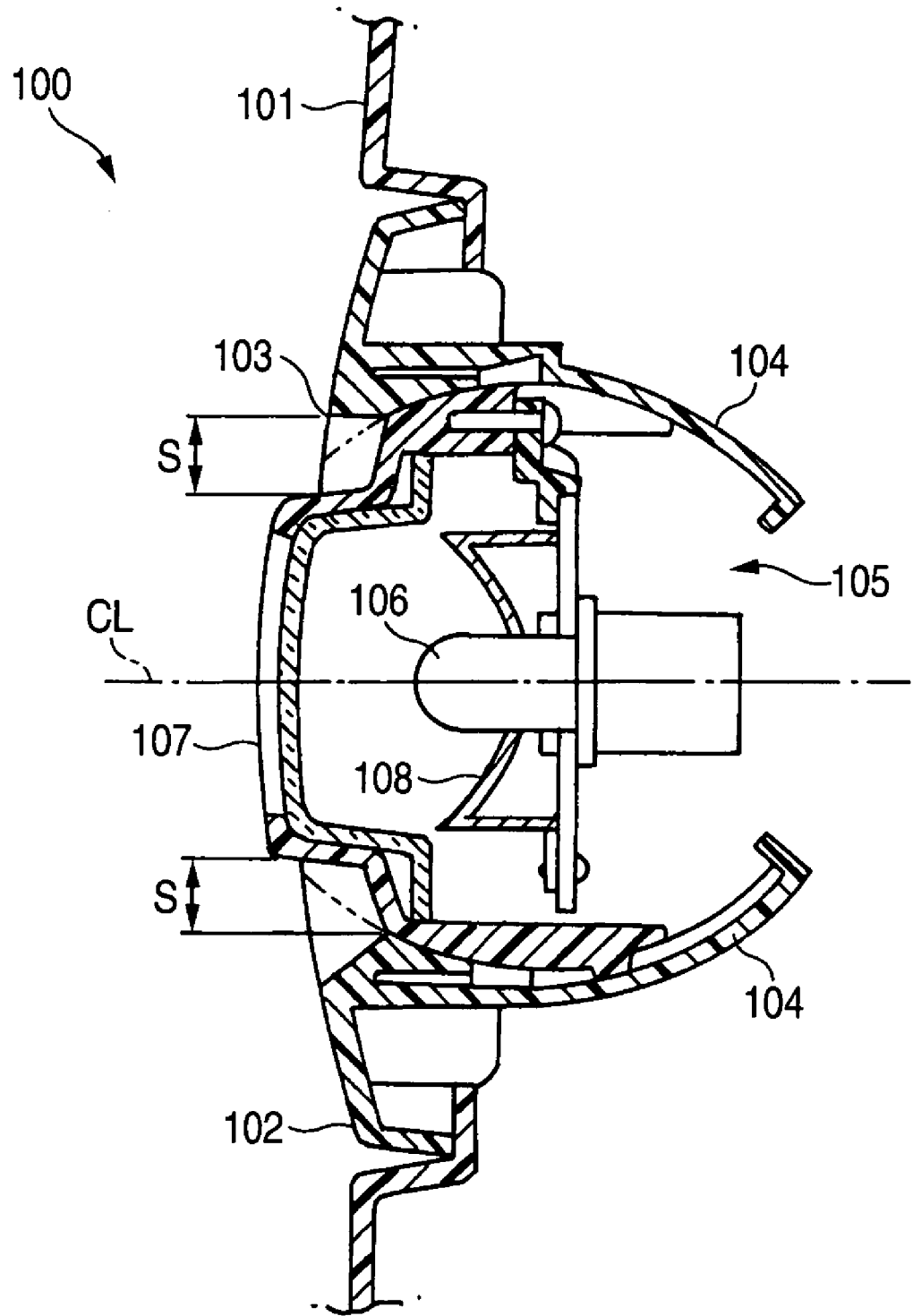
FIG. 7 is a cross-sectional view showing one conventional interior illumination lamp.
Figure 8:
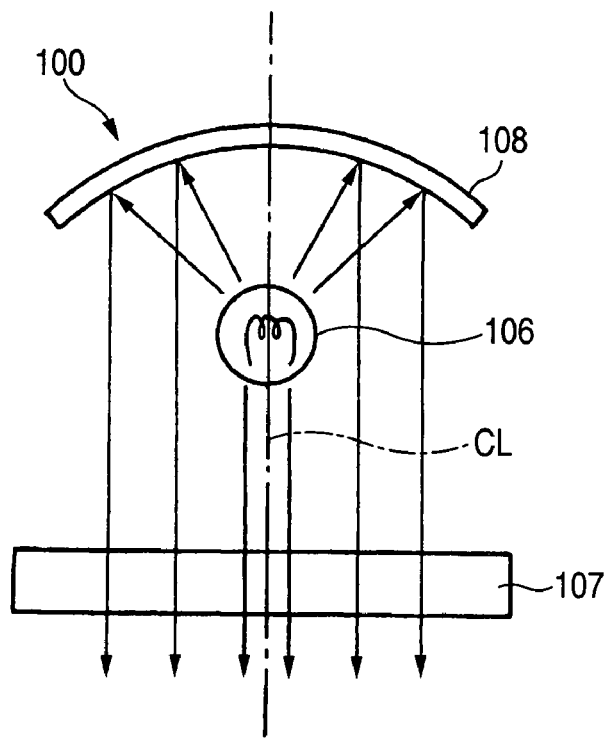
FIG. 8 is a view explanatory of the positional relationship of a bulb, a reflecting plate and a lens in the conventional interior illumination lamp.
Figure 9:
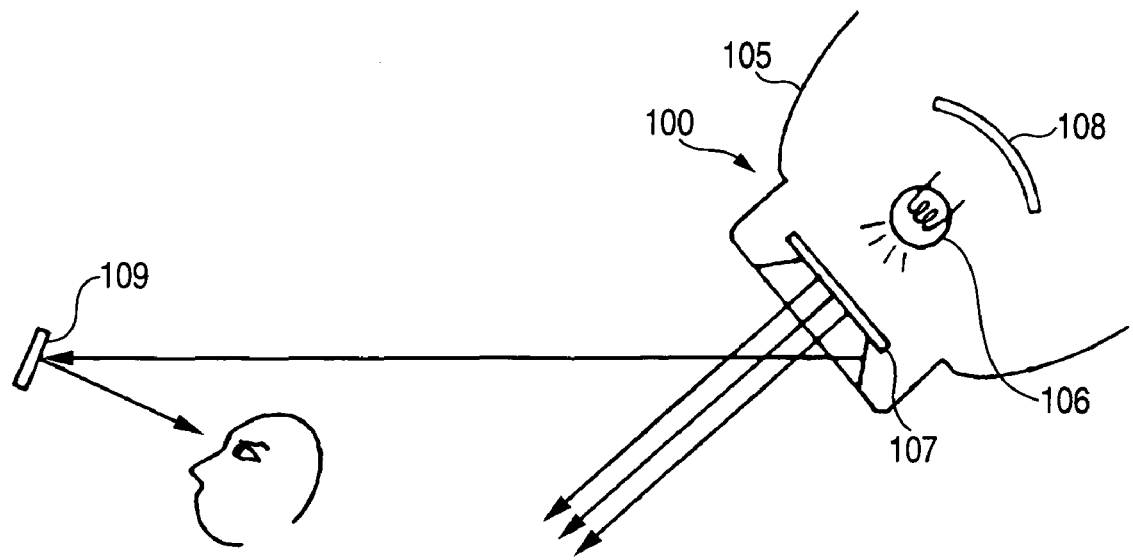
FIG. 9 is a view explanatory of problems with the conventional construction.

FIG. 5 shows the reflecting plate 40. This reflecting plate 40 includes a rectangular portion 40a having reflecting surfaces 41a and 41b, and a mounting portion 40b for mounting on the function portion body 30. The two reflecting surfaces 41a and 41b are provided on the rectangular portion 40a, and are juxtaposed to each other in a forward-rearward direction of the vehicle. Each of the reflecting surfaces 41a and 41b has a concave shape as a whole although these reflecting surfaces can be formed into any other suitable shape in accordance with the purpose. The two reflecting surfaces 41a and 41b are symmetrical with respect to a boundary line 42 between the two reflecting surfaces 41a and 41b, or are symmetrical with respect to a center point P on the boundary line 42. One reflecting surface 41a reflects light generally toward the other reflecting surface, while the other reflecting surface 41b reflects light generally toward the one reflecting surface. Therefore, one reflecting plate 40 is turned 180 degrees about the mounting portion 40b to be disposed in inverted relation to the other reflecting plate 40 so that the two reflecting plates 40 can be used for the left and right seats, respectively, and by doing so, the reflecting surfaces 41a and 41b, having the same overall configuration, can be used in common for the left and right seats.

FIG. 6 shows the positional relationship of the bulb 37 (serving as the light source), the reflecting surfaces 41a and 41b and the lens 54 when the function portion body 30 is joined to the housing 21. Namely, the bulb 37 and the reflecting surfaces 41a and 41b are disposed in offset relation to the lens 54, and an optical axis LB1 of light from the bulb 37 and an optical axis LB2 of reflected light from the reflecting plate 40 intersect an axis of the lens 54 in the forward-rearward direction.

FIG. 6A shows a condition obtained when the right seat is viewed from the center of the car room, and FIG. 6B shows a condition obtained when the left seat is viewed from the center of the car room. In the left seat, the rear reflecting surface 41a of the reflecting plate 41 is used, and a beam from the bulb 37 is reflected forwardly by the reflecting surface 41a as shown in FIG. 6A. Even in this case, the light from the bulb 37 is reflected by the slightly-forwardly disposed reflecting surface 41b, and is incident on the lens 54. Similarly, in the right seat, light is reflected forwardly, using the rear reflecting surface 41b of the reflecting plate 40, and light from the bulb 37 is reflected by the slightly-rearwardly disposed reflecting surface 41a, and is incident on the lens 54 as shown in FIG. 6B.

As described above, in the interior illumination lamp 10, the bulb 37 and the reflecting plate 40 are disposed in offset relation to the lens 54 so that the optical axis LB1 of a beam, emitted from the bulb 37, and the optical axis LB2 of reflection light, reflected by the reflecting plate 40, intersect the axis CL of the lens 54 in the forward-rearward direction. Therefore, the beam can be radiated forwardly without directing the lens 54 forwardly. Therefore, there will not be encountered a situation in which part of the lens 54 shines as when the lens 54 is directed forwardly, and such light is prevented from coming into the driver's sight via a room mirror, and therefore even when the interior illumination lamp 10 is used during the travel of the car, the driving operation will not be affected.

And besides, the reflecting plates 40 can be used in common for the left and right lamps 50L and 50R, and therefore the number of the kinds of the parts can be reduced, so that the cost can be reduced. Furthermore, this prevents an erroneous operation in which the left and right reflecting plates 40 are mounted in a reversed manner. Moreover, the reflecting plate 40 has the two reflecting surfaces 41a and 41b, and therefore a beam from the bulb 37 is reflected also by that reflecting surface 41 which is not used, and part of the beam is radiated to the car room via the lens 54, so that the car room can be more brightened.

The interior illumination lamp 10 of the invention is not limited to the above embodiment, and suitable modifications, improvements, etc., can be made.

For example, with respect to the configuration of the reflecting plate 40, although the two reflecting surfaces 41a and 41b are provided on the rectangular portion 40a, and further the mounting portion 40b is provided, the reflecting plate is not limited to this configuration. Namely, any suitable configuration can be adopted in so far as such reflecting plate has two reflecting surfaces 41a and 41b, and can be mounted on the function base portion.

And besides, the material, shape, dimensions, form, number, mounting position, etc., of the sliding contact member, outer bezel, inner bezel, function potion body, design portion housing, etc., of the above embodiment are arbitrary, and are not limited in so far as the invention can be achieved.

What is claimed is:

1. An interior illumination lamp comprising:
   a light source for emitting a beam;
   a reflecting plate which includes two reflecting surfaces having an identical shape symmetrically with respect to each other about a boundary line of said reflecting plate, wherein one of the reflecting surfaces reflects the beam from the light source in a first direction, and the other of the reflecting surfaces reflects the beam from the light source in a second direction which differs from the first direction; and
   a lens for transmitting the beam from said light source and the beam from said reflecting plate therethrough, the lens having an optical axis,
   wherein said reflecting plate is disposed in offset relation to the optical axis of said lens in a rearward direction and said light source is disposed in offset relation to the boundary line of said reflecting plate in the rearward direction so that an optical axis of the beam radiated from said light source toward the lens and an optical axis of the reflected light reflected from the one of said two reflecting surfaces toward the lens intersect the optical axis of said lens in a forward direction.

2. An interior illumination lamp as claimed in claim 1, wherein said reflecting surfaces are arranged in the forward-rearward direction, and are provided a pair of said light sources, and a pair of said reflecting plates and a pair of said lens each pair of which are provided respectively for first and second directions, said pair of reflecting plates, having an identical construction, are used.

3. The interior illumination lamp as claimed in claim 1 further comprising a design portion and a function portion, said design portion including a housing exposed to an interior of a vehicle containing the illumination lamp.

4. The interior illumination lamp as claimed in claim 3, wherein said function portion houses said lens and said reflecting plate.

5. The interior illumination lamp as claimed in claim 4, wherein the light source is mounted in the function portion.

6. The interior illumination lamp as claimed in claim 3, further comprising a ring member for supporting the light source, said ring member being mounted to said function portion.

7. The interior illumination lamp as claimed in claim 1, wherein the two reflecting surfaces are offset from each other in a forward-rearward direction.

8. The interior illumination lamp as claimed in claim 1, wherein the boundary line of said reflecting plate is a center line of said reflecting plate.

9. An interior illumination lamp for a vehicle, comprising:
a light source for emitting a beam;
a reflecting plate which includes two reflecting surfaces having an identical shape symmetrically with respect to each other about a boundary line of said reflecting plate, wherein one of the reflecting surfaces reflects the beam from the light source in a first direction, and the other one of the reflecting surfaces reflects the beam from the light source in a second direction which differs from the first direction; and
a lens for transmitting the beam from said light source and the beam from said reflecting plate therethrough, the lens having an optical axis,
wherein said reflecting plate is disposed in off-set relation to the optical axis of said lens in one direction of a rearward direction and a forward direction with respect to said vehicle and said light source is disposed in offset relation to the boundary line of said reflecting plate in the one direction so that an optical axis of substantially all of the beam radiated from said light source toward the lens and an optical axis of substantially all of the reflected light reflected from the one of said two reflecting surfaces toward the lens intersect the optical axis of said lens only in the other direction of the forward direction and the rearward direction with respect to said vehicle.

10. The interior illumination lamp as claimed in claim 9, wherein the boundary line of said reflecting plate is a center line of said reflecting plate.

\* \* \* \* \*